US009061709B2

(12) United States Patent
Ramoutar et al.

(10) Patent No.: US 9,061,709 B2
(45) Date of Patent: Jun. 23, 2015

(54) STRUCTURAL BODY PART HAVING A SPACER

(71) Applicants: Toyota Motor Engineering & Manufacturing North America, Inc., Erlanger, KY (US); Toyota Motor Corporation, Toyota (JP)

(72) Inventors: Naipaul D. Ramoutar, Ann Arbor, MI (US); Taichi Yamashita, Northville, MI (US); Koji Saeki, Okazaki (JP)

(73) Assignees: Toyota Motor Engineering & Manufacturing North America, Inc., Erlanger, KY (US); Toyota Motor Corporation, Toyota (JP)

( * ) Notice: Subject to any disclaimer, the term of this patent is extended or adjusted under 35 U.S.C. 154(b) by 173 days.

(21) Appl. No.: 13/684,718

(22) Filed: Nov. 26, 2012

(65) Prior Publication Data
US 2013/0270853 A1 Oct. 17, 2013

Related U.S. Application Data

(60) Provisional application No. 61/623,817, filed on Apr. 13, 2012.

(51) Int. Cl.
| B62D 27/06 | (2006.01) |
| B62D 27/02 | (2006.01) |
| B62D 25/02 | (2006.01) |
| F16B 37/04 | (2006.01) |

(52) U.S. Cl.
CPC ......... *B62D 27/023* (2013.01); *Y10T 29/49622* (2015.01); *B62D 25/025* (2013.01); *B62D 27/06* (2013.01); *F16B 37/044* (2013.01)

(58) Field of Classification Search
CPC .... B62D 27/023; B62D 27/06; B62D 27/065; B62D 27/02; B62D 25/025
USPC ............................. 296/29, 30, 209, 1.06, 199
See application file for complete search history.

(56) References Cited

U.S. PATENT DOCUMENTS

| 4,755,090 A * | 7/1988 | Macfee et al. .................. 411/82 |
| 5,306,091 A * | 4/1994 | Zaydel et al. ................. 411/175 |
| 6,357,811 B1 * | 3/2002 | Nakamura et al. .............. 296/29 |
| 6,931,730 B2 * | 8/2005 | Elliott et al. ................. 29/897.2 |
| 7,726,718 B2 * | 6/2010 | Weirup ............................ 296/30 |
| 7,891,151 B2 * | 2/2011 | Sano .......................... 52/506.05 |
| 2010/0119324 A1* | 5/2010 | Townson et al. .............. 411/180 |
| 2012/0153682 A1* | 6/2012 | Rawlinson et al. ........... 296/209 |

FOREIGN PATENT DOCUMENTS

EP            58508 A1 *   8/1982     ............ B62D 25/18

\* cited by examiner

*Primary Examiner* — Jason S Morrow
*Assistant Examiner* — E Turner Hicks
(74) *Attorney, Agent, or Firm* — Gifford, Krass, Sprinkle, Anderson & Citkowski, P.C.

(57) ABSTRACT

A structural body part and a method of assembling a structural body part are provided. The structural body part includes an inner wall surface defining an enclosed space. A nut is disposed within the enclosed space. The structural body part includes an aperture for receiving a fastener so as to accommodate the addition of additional structure. The body structure includes a spacer. The nut is attached to the spacer. The spacer is configured to suspend the nut above the inner wall surface of the structural body part. Thus, the inner wall surface of the structural body part is exposed and covered with a solution when submersed therein.

18 Claims, 6 Drawing Sheets

STRUCTURAL BODY PART HAVING A SPACER

FIELD OF THE INVENTION

The invention is directed towards a structural body part and method for assembling a structural body part, wherein a nut is disposed in an enclosed space.

BACKGROUND OF THE INVENTION

Structural body parts, such as a rocker for an automotive vehicle may include an enclosed space. Often times, additional structure may be mounted onto the structural body part. Thus, manufacturers often provide an aperture for receiving a fastener such as a bolt configured to secure the additional structure to the structural body part. Within the enclosed space, manufacturers will also provide a nut and a cage. The cage is operable to hold the nut within a desired position. The nut is positioned within the cage such that the nut opening is registered to the aperture of the structural body part. This is typically done by placing an adhesive strip between the nut and the structural body part. However, a portion of the inner wall surface of the structural body part is covered by the adhesive tape. Thus, a fastener such as a bolt may be inserted into the aperture and screwed onto the nut, so as to fix the additional structure to the structural body part. It should be appreciated that the structural body part may include a plurality of nuts and a corresponding number of cages so as to accommodate the attachment of additional structure.

In cases where the structural body part is submerged in a solution such as an anti-corrosive additive or paint, the inner wall surface defining the enclosed space of the structural body part is covered by the adhesive. Thus, only the exposed portion of the nut is treated with the solution, and a portion of the inner wall surface of the structural body part is left untreated with the solution. Accordingly, it remains desirable to have a device operable to position the nut so as to be free of the inner wall surface of the structural body part so as to expose the structural body part to solution during submersion.

SUMMARY OF THE INVENTION

According to one aspect of the invention, a structural body part having a spacer is provided. The spacer is operable to suspend a nut above the inner wall surface of the structural body part so to ensure that the top or bottom surface of the nut and the entire surface of the inner wall surface of the structural body part are treated with solution. Thus, the structural body part may be chemically enhanced to resist corrosion, thereby preserving the life and use of the structural body part.

The structural body part includes an outer wall having an inner wall surface defining an enclosed space. The outer wall may be formed of two pieces of material or a plurality of parts combined together to enclose the space. A nut is disposed within the enclosed space. An aperture is formed on the outer wall.

The spacer may be formed of a durable material such as steel, and may be formed by a stamping process. The spacer is disposed within the enclosed space. The spacer includes a base having a first surface opposite a second surface. The spacer includes a leg extending outwardly from the second surface of the base. The leg of the base is fixed to the inner wall surface of the structural body part. Thus, the second surface of the base is spaced apart from and faces the inner wall surface of the structural body part.

Figure 3:
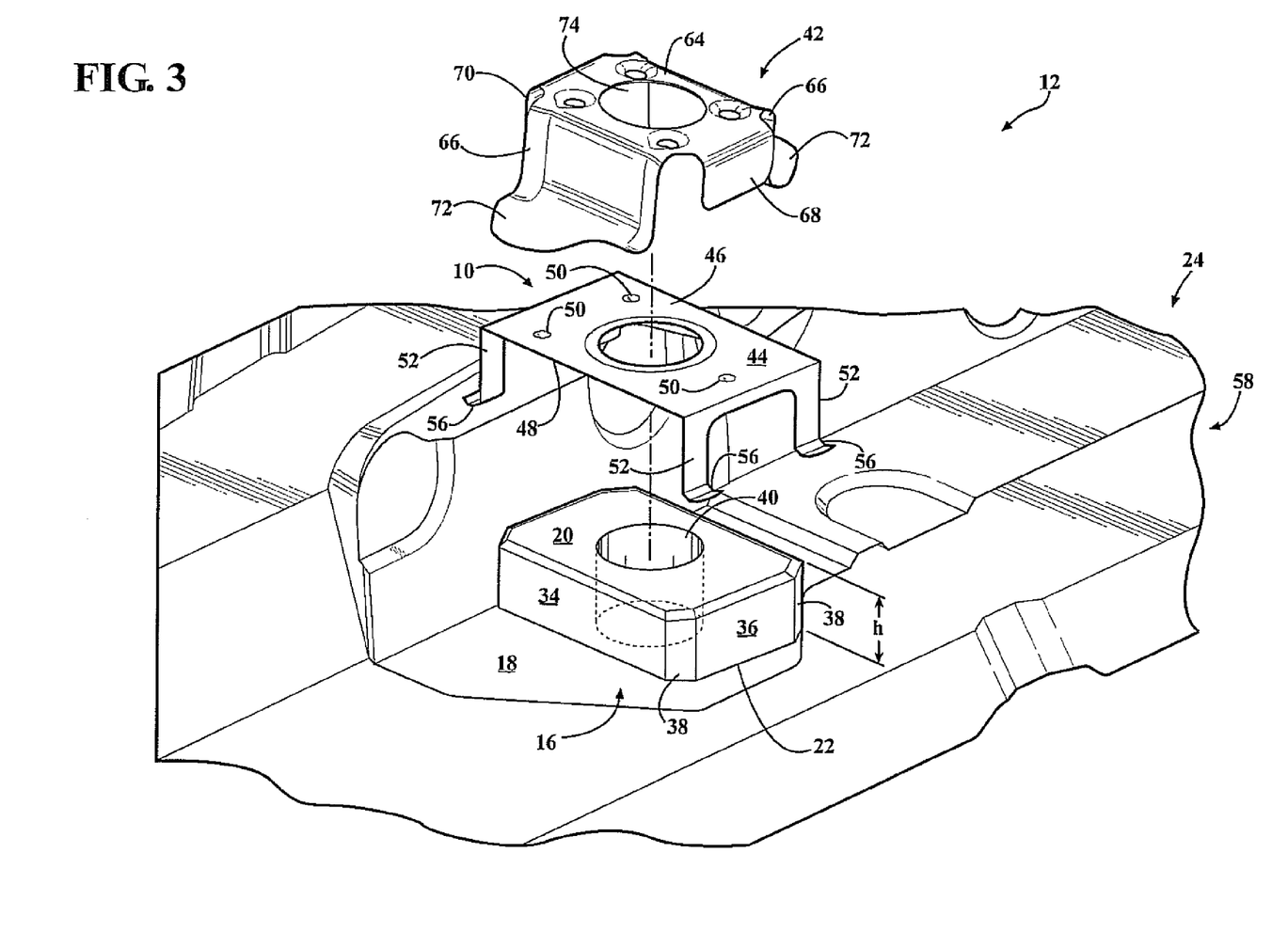
FIG. 3 is an exploded view showing the cage, spacer and nut.

The spacer may further include a dimple. The dimple is formed on the second surface of the base and protrudes outwardly in the same direction as the leg. The dimple extends into a point. The point is raised relative to the second surface. The dimple may be formed as part of the stamping process. The cage may also include a corresponding dimple, as shown in FIG. 3, the cage and spacer may be spot welded together at the point where corresponding dimples are engaged.

The leg has a length longer than the height of the nut for which the spacer is utilized. The distal end of the leg may be bent relative to an elongated portion of the leg. The elongated portion of the leg extends from the base towards the inner wall surface. The bent portion of the leg may be attached to the inner wall surface of the outer wall.

As used herein, the height of the nut is defined by the length as measured axially from a bottom surface to a top surface of the nut. The nut further includes an opening. Preferably the opening is threaded so as to retain a corresponding fastener such as a bolt.

The nut is mounted to the second surface of the base. The spacer is mounted to the inner wall surface so as to register the opening of the nut with the aperture of the outer wall so as to facilitate the engagement of the fastener with the nut.

The leg of the spacer is fixed to the inner surface wall of one of the parts making up the structural body part. The nut is fixed to the dimple. The nut may be fixed thereto using spot welding, or an adhesive. Since the leg is longer in length than the height of the nut, the bottom surface of the nut is suspended above and spaced apart from the inner wall surface.

Thus, the structural body part may be submerged into a paint solution or an anti-corrosive additive and the inner wall surface of the structural body part, as well as the top and bottom surfaces of the nut may be coated thereby preventing rust from forming between the nut and the inner wall surface of the structural body part.

A method of assembling a structural body part enclosing a space with a nut disposed therein is also provided. The method includes the step of providing a spacer. The spacer is mounted to the inner wall surface of the structural body part. The spacer is configured to engage the nut and positions the nut within the enclosed space so as to be spaced apart from the inner wall surface of the structural body part. The method proceeds to the step of attaching the nut to the spacer, and attaching the spacer, with the nut fixed thereto, to the inner wall surface of the structural body part. Submerging the structural body part in a solution having an anti corrosive additive so as to coat the inner wall surface of the structural body part, as well as the top surface, bottom surface and sides of the nut so as to help prevent rust from forming between the bottom surface of the nut and the inner wall surface of the structural body part.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

With reference now to FIGS. 1-4, an illustration of a spacer 10 disposed within a structural body part 12 is provided. The spacer 10 is disposed within an enclosed space 14 of the structural body part 12. The spacer 10 is operable to suspend a nut 16 above the inner wall surface 18 of the structural body part 12 so as ensure that the top surface 20 or bottom surface 22 of the nut 16, as well as the inner wall surface 18 of the of the structural body part 12 is coated with a solution such as paint, or an anti-corrosive additive when the structural body part 12 is submerged in the solution. Thus, the spacer 10 exposes the inner wall surface 18 to a chemical treatment. Accordingly, rust formation is mitigated as a portion of the inner wall surface 18 of the structural body part 12 covered by the nut 16 may now be treated with the solution.

The structural body part 12 includes an outer wall 24 having an inner wall surface 18 defining the space 14. The outer wall 24 may be formed of two pieces of material or a plurality of parts combined together so as to form the enclosed space 14 between opposing pieces of material. The structural body part 12 is formed of a rigid and durable material operable to provide structural support for additional structure such as body components of an automotive vehicle. The structural body part 12 includes a plurality of apertures 26 selectively disposed on an outer surface 28 of the structural body part 12. The apertures 26 are configured to receive a mechanical fastener 30 such as a bolt 30 so as to secure additional structure to the structural body part 12. An elongated portion 32 of the bolt 30 is threaded into the enclosed space 14, and the head of the bolt 30 is disposed on the outer surface 28 of the outer wall 24 of the structural body part 12. Material suitable for use in manufacturing the structural body part 12 includes but is not limited to steel, iron or a steel composite.

Figure 2:
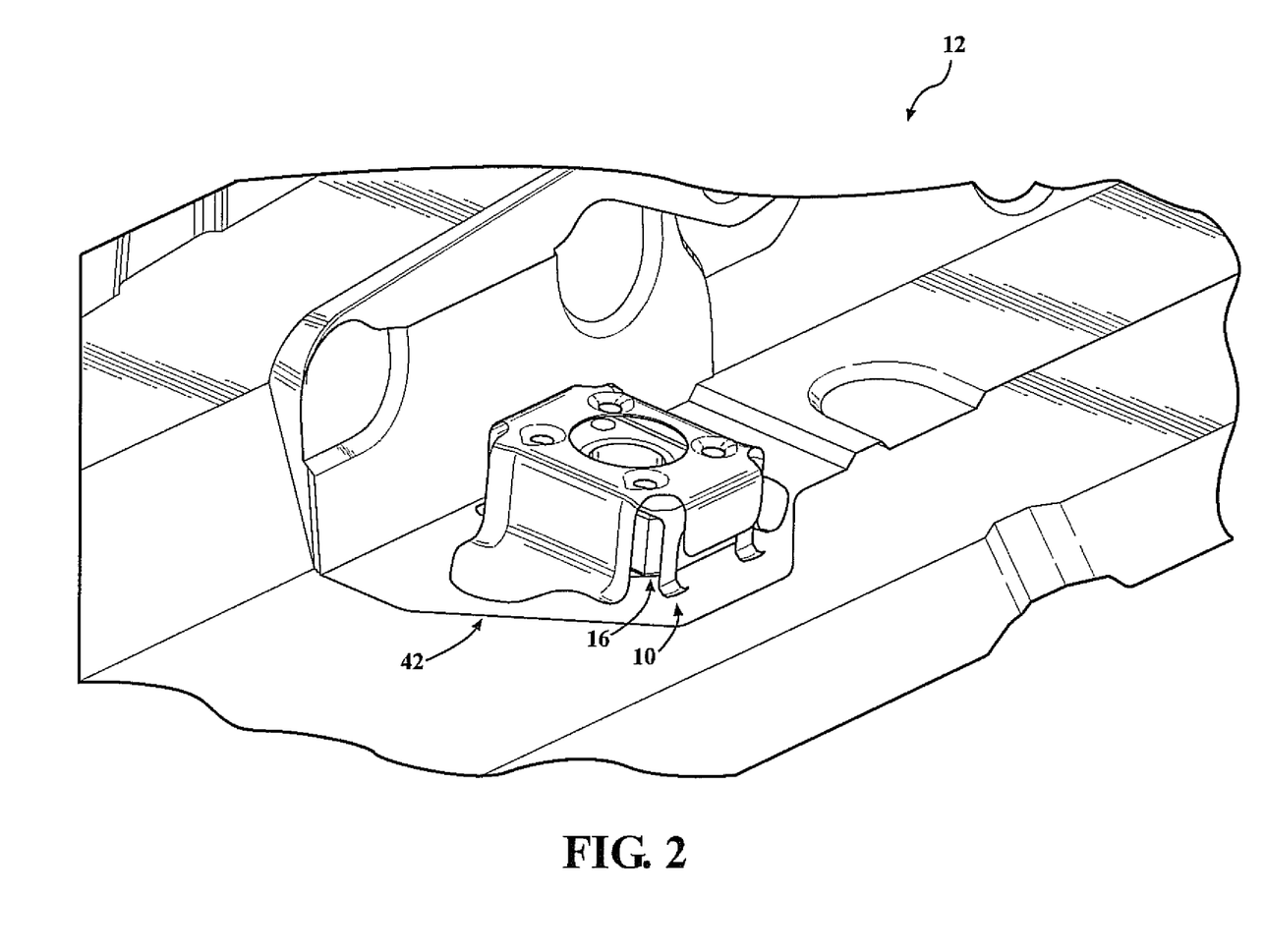
FIG. 2 is an isolated view of the inner space of the structural body part showing one of the cages of FIG. 1.
Figure 5:
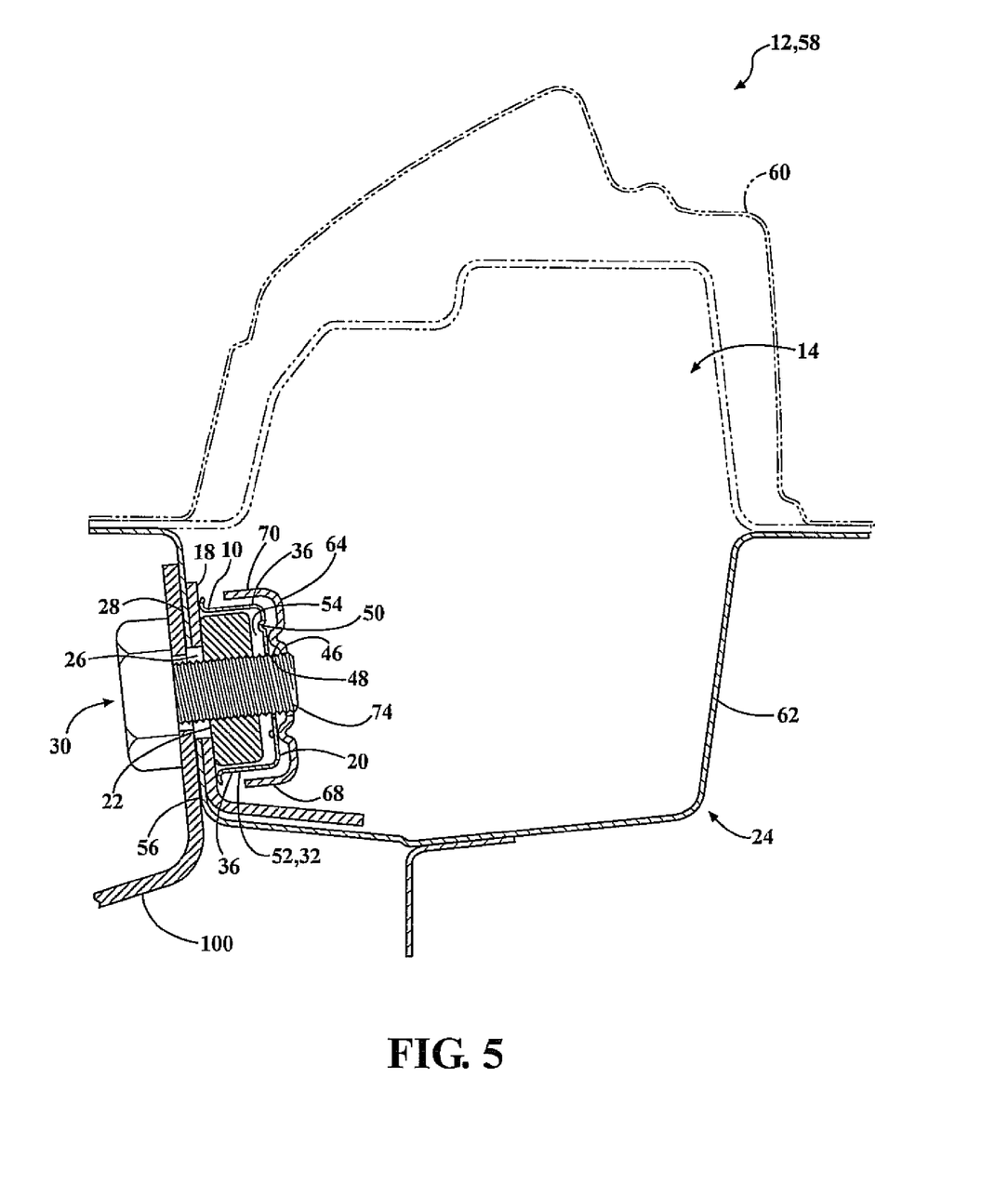
FIG. 5 is a cross-sectional view of the structural body part showing additional structure attached to the structural body part.

With reference now to FIGS. 2 and 3, an illustration of the nut 16 is provided. The nut 16 is disposed within the enclosed space 14. The nut 16 is shown as having a generally octagonal body, having a pair of side walls 34, a pair of end walls 36, and four corner walls 38. The side walls 34 are generally longer than the end walls 36, and four corner walls 38 extend between a respective side wall 34 and end wall 36. The corner walls 38 are shorter in width than both the side walls 34 and end walls 36. However, it should be appreciated that the nut 16 may be dimensioned otherwise, and that the dimension shown herein is not limiting, but shown for illustrative purposes only. The nut 16 includes an opening 40. The opening 40 of the nut 16 is positioned within the cage 42 so as to be registered to the aperture 26 formed on the outer wall 24 of the structural body part 12. The fastener 30 such as a bolt 30 is configured to fit through the aperture 26 and engage the opening 40 of the nut 16. Preferably, the opening 40 of the nut 16 is threaded, and the outer surface 28 of the bolt 30 is also threaded. Thus, additional structure may be mounted to the structural body part 12, as shown in FIG. 5.

The spacer 10 may be formed of a durable material such as steel, and may be formed by a stamping process. The spacer 10 is disposed within the enclosed space 14. The spacer 10 is configured to hold the nut 16 above the inner wall surface 18 of the structural body part 12. The spacer 10 includes a base 44. The base 44 is generally planar and includes a first surface 46 opposite a second surface 48. The second surface 48 of the base 44 is spaced apart and facing the inner wall surface 18 of the structural body part 12. The base 44 includes a dimple 50, the dimple 50 protrudes outwardly from the second surface 48. The dimple 50 protrudes outwardly in the same direction as the leg 52 and ending in a point 54. The point 54 is raised relative to the second surface 48. The dimple 50 may be formed as part of the stamping process. The nut 16 may be fixed to the dimple 50 using an adhesive or a spot weld. For illustrative purposes, the spacer 10 is shown having three dimples 50, however it should be appreciated that the spacer 10 may include only one dimple 50, or a different number of dimples 50 based upon packaging design, or manufacturing desires.

The spacer 10 includes at least one leg 52 extending outwardly from the second surface 48 of the base 44. The end portion of the leg 52 of the spacer 10 is fixed to the inner wall surface 18 of the structural body part 12. The leg 52 has a length longer than the height of the nut 16 for which the spacer 10 is utilized. Thus, the nut 16 is fixed within the space 14 defined by the spacer 10 and held apart from the inner wall surface 18 of the structural body part 12. The distal end 56 of the leg 52 may be bent relative to an elongated portion 32 of the leg 52. The elongated portion 32 of the leg 52 extends from the base 44 towards the inner wall surface 18. The bent portion of the leg 52 may be attached to the inner wall surface 18 of the structural body part 12.

As used herein the height of the nut 16 is defined by the length as measured axially from the bottom surface 22 to the top surface 20 of the nut 16, as indicated by the solid line referenced as "h." The nut 16 further includes an opening 40. Preferably the opening 40 is threaded so as to retain a corresponding fastener 30 such as a bolt 30. The cage 42 and spacer 10 are further configured to align the opening 40 of the nut 16 with the aperture 26 of the structural body part 12 so as to facilitate the attachment of additional structure to the structural body part 12.

The nut 16 is mounted to the second surface 48 of the base 44. The nut 16 may be placed into contact with the point 54 of the dimple 50 and fixed thereto using a spot weld. The spacer 10 is mounted to the inner wall surface 18 so as to register the opening 40 of the nut 16 with the aperture 26 of the outer wall 24 so as to facilitate the engagement of the bolt 30 with the nut 16.

With reference again to FIG. 4, the nut 16 is shown suspended above the inner wall surface 18 of the structural body part 12. The leg 52 of the spacer 10 is fixed to the inner wall surface of the structural body part 12. Since the leg 52 is longer in length than the height of the nut 16, the bottom surface 22 of the nut 16 is suspended above and spaced apart the inner wall surface 18. It should be appreciated by those skilled in the art that the spacer 10 may include a plurality of legs 52, each of which are longer in length that the height of the nut 16. The legs 52 provide structural support to help the spacer 10 bear the weight of the nut 16. Thus, the structural body part 12 may be submerged into a paint solution or an anti-corrosive additive and the top and bottom surfaces 20, 22 of the nut 16 may be coated, thereby preventing rust from forming between the nut 16 and the inner wall surface 18 of the structural body part 12.

With reference again to FIGS. 1-4, an illustration of the structural body part 12 is provided. For illustrative purposes, the structural body part 12 is shown as a rocker 58 of a vehicle body frame (not shown); however, it should be appreciated by those skilled in the art that the structural body part 12 may be another body structure having an enclosed space 14 and an aperture 26 for mounting additional parts thereto, and the illustration of a rocker 58 is not limiting to the scope of the invention. The rocker 58 extends generally the length of the vehicle (not shown), between the front and rear wheels. The vehicle body frame includes a pair of rockers 58, each of which is generally symmetrical to the other and thus a discussion of one is illustrative of the other.

Figure 1:
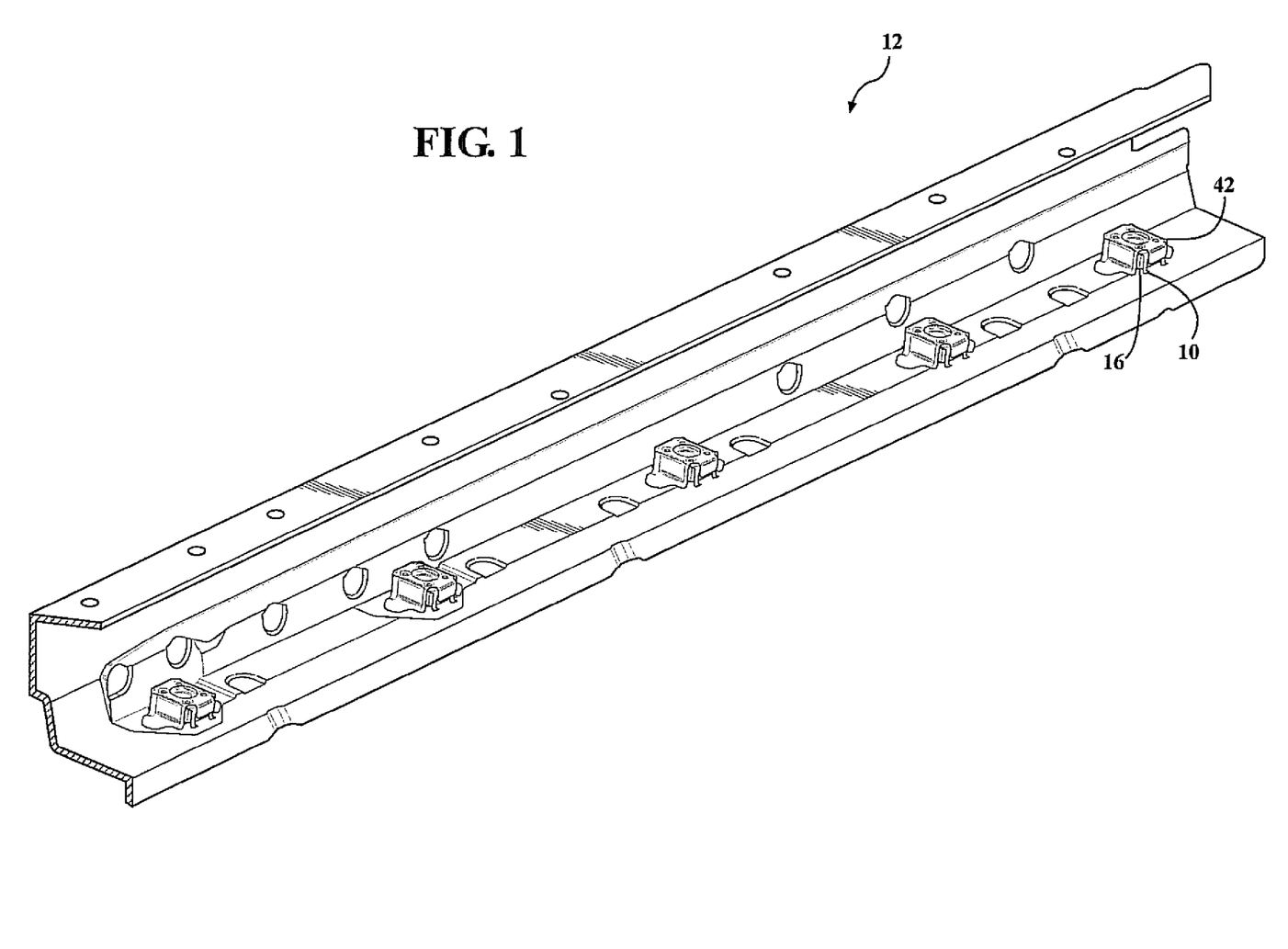
FIG. 1 is a perspective view of a structural body part showing the cages mounted to the inner wall surface of a lower part.

The rocker 58 includes an upper part 60 and a lower part 62. The upper and lower parts 60, 62 are welded together so as to form an outer wall 24 having an enclosed space 14. Various vehicle body components are mounted to the rocker 58. Thus, the rocker 58 includes a plurality of apertures 26, each of the apertures 26 correspond to a spot for which a vehicle body component is mounted to.

With reference now to FIGS. 1-4, an illustration of a cage 42 is provided. The rocker 58 may further include a plurality of cages 42. The number of cages 42 generally corresponds to the number of apertures 26 disposed along the rocker 58 for which additional structure is desired to be attached. The cage 42 is also formed of a durable and rigid material such as steel or an iron composite. Each cage 42 is mounted within the enclosed space 14 and to the inner wall surface 18 of the structural body part 12. Each cage 42 covers a respective aperture 26. Specifically, each cage 42 is mounted to the lower part 62 of the rocker 58.

The cage 42 includes a top wall 64 a pair of first walls 66, a front wall 68 and a back wall 70. The first walls 66 are spaced apart from each other and include an ear portion 72 extending generally orthogonal to the respective first wall 66. The ear portion 72 is fixed to an inner wall surface 18 of the structural body part 12, and extends outwardly with respect to the body of the cage 42. The cage 42 is dimensioned so as to enclose the nut 16 and cover the spacer 10, wherein the spacer 10 is disposed underneath the cage 42. The top wall 64 of the cage 42 is free and clear of the inner wall surface 18 of the enclosed space 14. The cage 42 includes a through-hole 74 for which a distal end 56 of a fastener 30 may engage.

Figure 4:
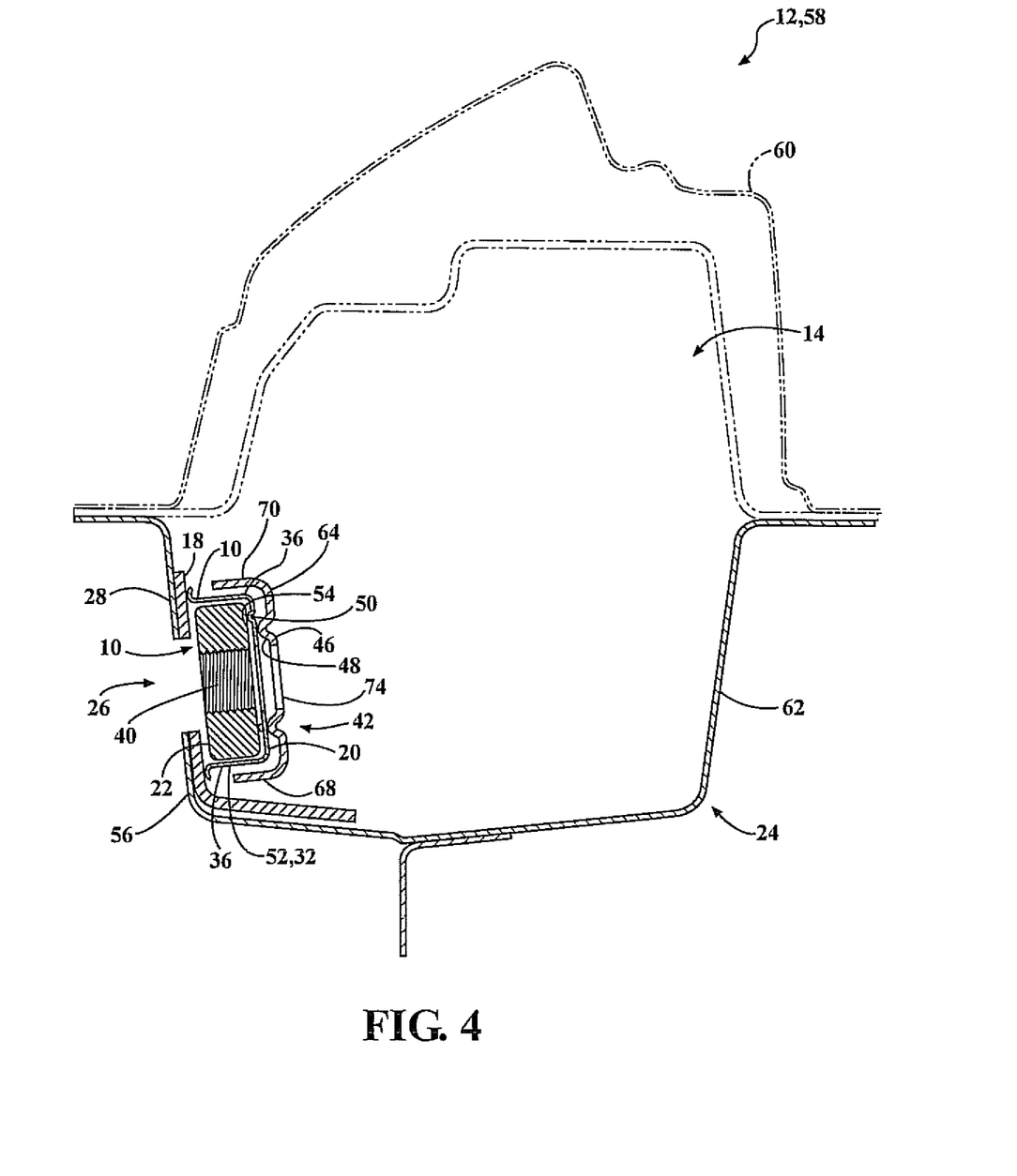
FIG. 4 is a cross-sectional view of a structural body part showing the cage, spacer and nut disposed within an enclosed space.

Each leg 52 of the spacer 10 is fixed to the inner wall surface 18 of the rocker 58. The nut 16 is fixedly mounted to the second surface 48 of the base 44 of the spacer 10. Specifically, the dimples 50 are fixed to the top surface 20 of the nut 16. Thus, the top surface 20 of the nut 16 faces and is spaced apart from the second surface 48 of the base 44. As the legs 52 are longer than the height of the nut 16, the bottom surface 22 of the nut 16 is spaced apart and faces the inner wall surface 18 of the rocker 58. Thus, the nut 16 is suspended above the inner wall surface 18 of the rocker 58. The opening 40 of the nut 16 is coaxial with a respective aperture 26 of the rocker 58.

In assembly, the nut 16 is attached to the second surface 48 of the spacer 10. The legs 52 of the spacer 10 are attached to the inner wall surface 18 of the structural body part 12 so as to align the opening 40 of the nut 16 with a respective aperture 26 of the structural body part 12. The cage 42 is mounted over the spacer 10. The figures show the spacer 10 and cage 42 mounted to the lower part 62 of the rocker 58; however, it should be appreciated that the spacer 10 and cage 42 may be mounted to the upper part 60, or both. The upper part 60 of the rocker 58 may be attached to the lower part 62 so as to form the enclosed space 14. The rocker 58 may then be submerged in a solution. It should also be appreciated that the rocker 58 may be submerged piecemeal, for instance, the lower part 62 may be submerged in the solution first, followed by the upper part 60. After receiving treatment, the upper and lower part 60, 62 are then attached to each other. In either case, the inner wall surface 18 of the rocker 58 which is to be engaged with the bottom surface 22 of the nut 16 is exposed to the solution during coating operations. The solution may be a paint, an anti-corrosive solution, or a paint having anti-corrosive properties. The rocker 58 is then baked so as to allow the solution to cure onto the treated surfaces.

With reference now to FIG. 5, an illustration showing the additional structure 100 mounted to the structural body part 12 is provided. The additional structure 100 is attached to the structural body part 12 using a bolt 30. The bolt 30 threadedly engages the nut 16. As the bolt 30 is screwed into the nut 16, the nut 16 is pulled closer to the inner wall surface 18 of the structural body part 12 until the inner wall surface 18 is pinched between the nut 16 and the additional structure 100. Thus, the nut 16 is shown displaced from the spacer 10. However, it should be appreciated that the spacer 10 may be made of a material which is sufficiently resilient so as to bend and remain fixed to the nut 16. Such material is known and used, such as steel or a steel composite having a thickness tuned to bend under such forces.

Figure 6:
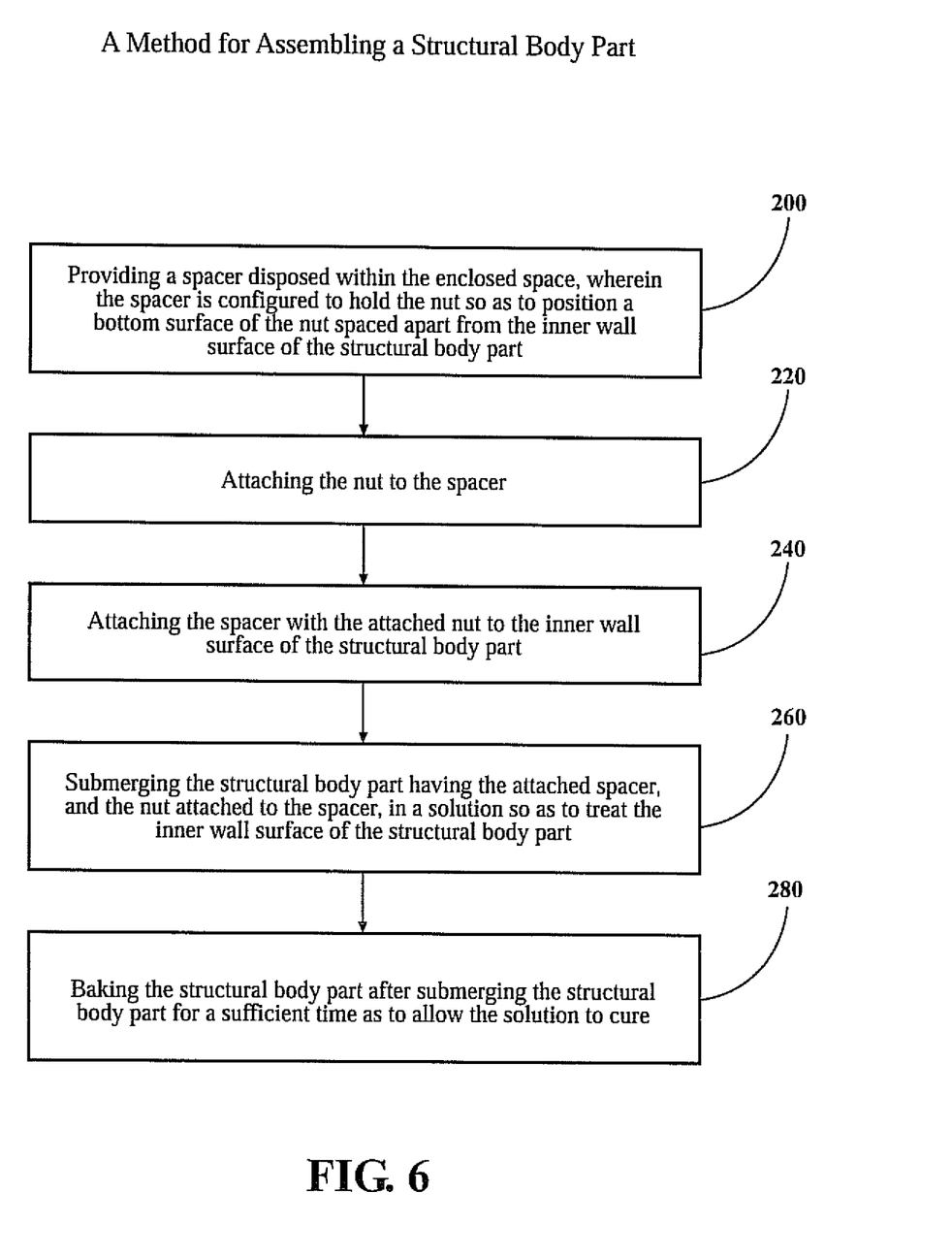
FIG. 6 are the steps for a method of assembling a structural body part.

With reference now to FIG. 6, a method of assembling a structural body part 12 having an inner wall surface 18 enclosing a space 14, and a nut 16 held within the space 14 by a cage 42 is provided. The method begins with step 200, providing a spacer 10. The spacer 10 is mounted to the inner wall surface 18 of the structural body part 12.

The spacer 10 may be formed of a durable material such as steel, and may be formed by a stamping process. The spacer 10 is disposed within the enclosed space 14. The spacer 10 includes a base 44. The base 44 is generally planar and includes a first surface 46 opposite a second surface 48. The second surface 48 of the base 44 faces the inner wall surface 18 of the structural body part 12, and the first surface 46 of the base 44 faces the inner wall of the cage 42.

The spacer 10 includes a leg 52 extending outwardly from the second surface 48 of the base 44. The leg 52 of the base 44 is fixed to the inner wall surface 18 of the structural body part 12. Thus, the second surface 48 of the base 44 is spaced apart and faces the inner wall surface 18 of the structural body part 12.

The leg 52 has a length longer than the height of the nut 16 for which the spacer 10 is utilized. The leg 52 may include a pair of ribs, (not shown) extending on opposite sides of the legs 52. The ribs are oriented axially along the length of the leg 52. The distal end 56 of the leg 52 may be bent relative to the remaining leg 52. The bent portion of the leg 52 may be attached to the inner wall surface 18 of the outer wall 24.

The method proceeds to the step 220, wherein the nut 16 is attached to the spacer 10. Preferably, the nut 16 is attached to the base 44. As the legs 52 are longer than the height of the nut 16, the bottom surface 22 of the nut 16 is spaced apart the inner wall surface 18 of the structural body part 12. Thus, the inner wall surface 18 of the structural body part 12 is exposed when the structural body part 12 is submerged in an additive such as paint or the like. The method proceeds to step 240, wherein the spacer 10, having the nut 16 fixed thereto, is attached to the inner wall surface 18 of the structural body part 12. Preferably, the distal end 56 of each leg 52 is attached to the inner wall surface 18 of the structural body part 12 so as to suspend the nut 16 above the inner wall surface 18. The legs 52 may be attached using a spot weld, or an adhesive.

The method may further include the step of providing a dimple 50 on the spacer 10 (not shown in the diagram). The dimple 50 is formed on the second surface 48 of the base 44 and protrudes outwardly in the same direction as the leg 52 and ending in a point 54. The point 54 is raised relative to the second surface 48. The dimple 50 may be formed as part of the stamping process. The top surface 20 of the nut 16 may be attached to the point 54 of the dimple 50.

The method further includes the step of submerging the structural body part 12 in a solution so as to coat the inner wall surface 18 of the structural body part 12, as well as the top surface 20, bottom surface 22 and sides of the nut 16 with the additive, as referenced by 260. The solution may be an anti-corrosive additive or a paint. It should be appreciated that the structural body part 12 is submerged in the solution with the spacer 10 attached to the inner wall surface 18 of the structural body part 12, and the nut 16 attached to the spacer 10. The nut 16 is suspended above the inner wall surface 18 of the structural body part 12 so as to expose the entire surface area of the structural body part 12 to the solution, with the exception of points 54 of contact where the spacer 10 and cage 42 are attached.

The method may further proceed to the step of baking the structural body part 12 so as to cure the solution to the surfaces of the structural body part 12, as referenced by reference numeral 280. It should be appreciated by those skilled in the art that the term baking is an acceptable term to describe a length of time necessary for the solution to cure or harden on the surface to which it is applied. Accordingly, baking as used herein incorporates a period of time and a degree of temperature necessary to cure the respective solution upon the treated surface. Upon completion of the curing process, a fastener 30 configured to engage the nut 16 may be used to attach additional structure to the structural body part 12.

Obviously, many modifications and variations of the present invention are possible in light of the above teachings and may be practiced otherwise than as specifically described while within the scope of the invention.

The invention claimed is:

1. A structural body part having an inner wall surface defining an enclosed space, a nut disposed within the enclosed space, and an aperture for receiving a fastener, the structural body part configured to support additional structure; the structural body part comprising:
    a spacer mounted within the enclosed space, the spacer having a base spaced apart from the inner wall surface of the structural body part, the nut attached to an undersurface of base and fully disposed within the spacer, the nut spaced apart from the inner wall surface of the structural body part and align the nut with the aperture.

2. The structural body part as set forth in claim 1, wherein the base includes at least one leg, the nut is fixed to the base, the at least one leg attached to the inner wall surface of the structural body part, the at least one leg dimensioned so as to suspend the nut above the inner wall surface of the structural body part.

3. The structural body part as set forth in claim 2, wherein the base further includes a first surface opposite a second surface, and a dimple, the second surface facing the inner wall surface, the dimple protruding outwardly from the second surface towards the inner wall surface.

4. The structural body part as set forth in claim 3, wherein the nut is fixed to the dimple.

5. The structural body part as set forth in claim 1, further including a cage, the cage mounted over the spacer.

6. The structural body part as set forth in claim 1, wherein the nut includes a bottom surface opposite a top surface, an opening extending between the bottom surface and the top surface, the height of the nut measure by a length as measured axially from the bottom surface to the top surface.

7. The structural body part as set forth in claim 6, wherein the spacer includes the base, and at least one leg, the at least one leg longer in length than the height of the nut, the nut fixed to the base, the at least one leg attached to the inner wall surface of the structural body part.

8. The structural body part as set forth in claim 7, wherein each of the at least one leg includes a rib, the rib oriented axially along the length of the leg, and wherein a distal end of the leg is bent relative to an elongated portion of the at least one leg.

9. The structural body part as set forth in claim 8, wherein the distal end of the leg is attached to the inner wall surface of the structural body part.

10. The structural body part as set forth in claim 1, wherein the structural body part is a rocker for use in a vehicle body frame.

11. The structural body part as set forth in claim 1, wherein the nut includes an opening, the opening is threaded and the fastener is a bolt, the opening is configured to threadingly receive the bolt, the spacer is further configured to align the opening of the nut with the aperture.

12. The structural body part as set forth in claim 11, wherein the base includes at least one leg, the at least one leg longer in length than the height of the nut, the nut fixed to the base, the at least one leg attached to the inner wall surface of the structural body part.

13. The structural body part as set forth in claim 12, wherein each of the at least one leg includes a rib, the rib oriented axially along the length of the leg, and wherein a distal end of the leg is bent relative to an elongated portion of the at least one leg.

14. The structural body part as set forth in claim 13, wherein the distal end of the leg is attached to the inner wall surface of the structural body part.

15. A method for assembling a structural body part, the structural body part having an inner wall surface defining an enclosed space, a nut held within the enclosed space by a cage, the method comprising the steps of:
    providing a spacer disposed within the enclosed space, the spacer having a base spaced apart from the inner wall surface of the structural body part, the base spaced apart from the inner wall surface of the structural body part a sufficient distance so as to allow the nut to be fixed to be spaced apart from the inner wall surface of the structural body part;
    attaching the nut to the spacer;
    attaching the spacer with the attached nut to the inner wall surface of the structural body part; and
    submerging the structural body part having the attached spacer, and the nut attached to the spacer in a solution so as to treat the inner wall surface of the structural body part.

16. The method as set forth in claim 15, further including the step of baking the structural body part after submerging the structural body part for a sufficient time so as to allow the solution to cure.

17. The method as set forth in claim 15, wherein the solution is a paint.

18. The method as set forth in claim 15, wherein the solution is an anti-corrosive additive.

* * * * *